H. Knight,
Tile Machine.

Nº 28,184.   Patented May 8, 1860.

Witnesses:

Inventor:
Henry Knight.

UNITED STATES PATENT OFFICE.

HENRY KNIGHT, OF JERSEY CITY, NEW JERSEY.

MOLD FOR MOLDING CEMENT PIPES.

Specification forming part of Letters Patent No. 28,184, dated May 8, 1860; Reissued February 25, 1862, No. 1,277.

*To all whom it may concern:*

Be it known that I, HENRY KNIGHT, of Jersey City, in the county of Hudson and State of New Jersey, have invented a new and useful Improvement in Molds for Molding Hydraulic-Cement Pipes; and I do hereby declare that the following is a full, clear, and exact description of the same, reference being had to the accompanying drawings, forming a part of this specification, in which—

Figure 1:
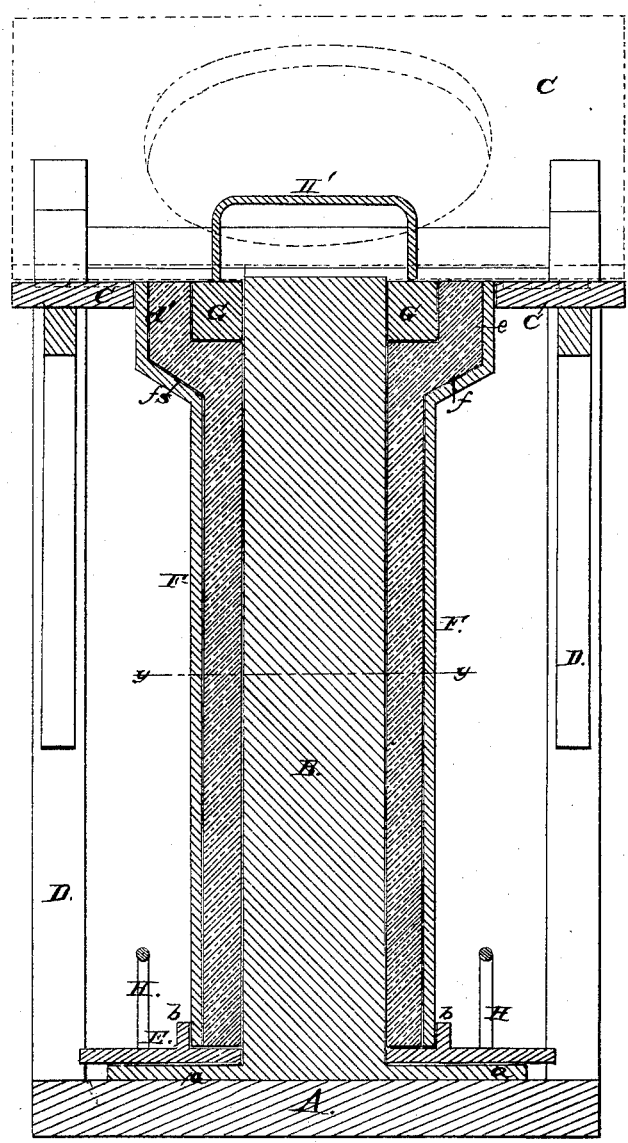
Figure 2:
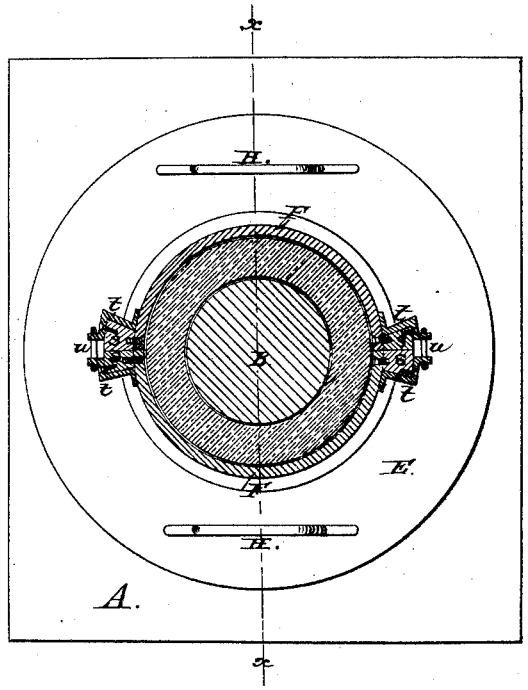

Figure 1, is a vertical transverse section of my arrangement for molding the sections of the pipe. Fig. 2, is a horizontal section of the same.

Similar letters of reference, in each of the several figures indicate corresponding parts.

Practice has demonstrated that hydraulic cement pipes answer a better purpose for underground draining than metal or burnt clay pipe, as it is free from all liability to rust and at the same time is much cheaper than metal and even burnt clay pipe. Also because it allows of branch connections being readily formed without danger of damaging the "main."

To enable others, skilled in the art, to make and use my invention, I will proceed to describe its construction and operation.

A, represents a platform on which the molds are arranged.

B, is a central metallic core bolted firmly to the platform and projecting up, with a slight taper, some three feet from the same, and passing through an annular opening in the center of a hinged table C, of the frame D.

E, is a base plate fitted loosely around the core and resting on the base flanch $a$, $a$, of the same. This plate has a raised rim $b$, projecting from its upper surface about half an inch, or instead thereof a groove of the same depth may be formed in the plate.

F, is a metallic mold made of a little less diameter than the rim $b$, so as to fit snugly within the same. This mold is made in two semi-cylindrical sections which have flanches $s$, $s$, by which they are locked together through the aid of straps $t$, $t$, and wedge staples $u$, $u$. The mold thus formed surrounds the metallis core so that a space exists between it and the core, of just the same width as the required thickness of the pipe which is to be molded. It should be observed that the base of the mold rests upon the base plate E, and that said base plate closes up the bottom of the mold, or in other words forms a detachable bottom to the same. The top of the mold from $d$ to $e$, is made of greater diameter than its base and said enlarged portion has its connection with the smaller portion formed by means of a beveled shoulder $f$. The enlarged or top portion of the mold just fits the annular opening in the hinged table C, and therefore when said hinged table is turned down as shown in black, from the position shown in red, the mold is held perfectly true with the core.

G, is a removable collar of the core. This collar is placed over the top of the core during a certain stage of the operation of molding the pipe, it is made removable in order to allow of the ready introduction, and the ramming down of the cement into the mold.

H, H', are handles formed on the base plate E, and the removable collar G, for the purpose of facilitating the moving of the same during the molding process.

To mold hydraulic cement pipe with my improved mold, I proceed as follows: All the parts excepting the collar G, being arranged in the position shown in Fig. 1, I force and ram the cement which rests on the table C, into the mold gradually until the mold is filled to within a short distance of its upper edge. I now place the collar G, over the core and force the same down into the cement until its upper surface comes even with the upper edge of the mold and core; this being done I force and ram cement between the circumference of the collar, and the enlarged part of the mold until the cement rises level with or above the top of the mold when with a trowel or other implement I "strike" off the surplus cement. The molding of the pipe is now completed, and as soon as the cement becomes "set" I proceed as follows to remove the pipe from the mold. The hinged table C, is first thrown up to the position shown in red. The collar G, is now withdrawn by first gently turning it slightly so as to loosen it and then drawing it upward. The mold, with the pipe in it, is next raised by lifting the base plate on which it rests, by its handles until it clears the top of the core. The base plate with mold and pipe attached is now set upon the floor and the mold is lifted until it frees itself of the base plate. The base of the mold is now allowed to rest on the floor and the fastenings which lock the sections together gently withdrawn, and while gently tapping the upper edge of the mold, its sections are removed laterally and the pipe left standing on its smaller end.

Thus operating enables me to make a pipe with ends or corners perfectly whole or unbroken, for the base plate enables me to draw the mold with the pipe in it, over the core, it supporting the pipe until the mold is fully clear of the top of the core. Without the aid of the base plate, it would be necessary as usual to draw the core from the mold, and in doing this the ends or corners of the pipes are very frequently broken off and difficulty attends the formation of a perfectly tight line of drain pipes. I also am enabled to form sockets with square shoulders in one end of each section of pipe and thus make a more perfect, close and permanent joint than is obtained with the male and female bevels formed on the ends of the hydraulic cement pipes in use.

What I claim as my invention and desire to secure by Letters Patent, is—

1. The combination of the stationary core B, mold F, with base E, b, and hinged table C, constructed and arranged for joint operation in the manner and for the purpose described.

2. The stationary core B, and mold F, having the enlarged top d, e, f, and base F, b, in combination with hinged table C, and detachable collar G, in the manner and for the purpose substantially as specified.

The above specification of my improvement in molding hydraulic cement signed by me this 27th day of February 1860.

HENRY KNIGHT.

Witnesses:
GOODWIN Y. ATLEE,
R. W. FENWICK.